United States Patent [19]

Jarret et al.

[11] 4,399,565

[45] Aug. 16, 1983

[54] DEVICE FOR TRIGGERING AN ALARM SYSTEM IN THE EVENT OF INSUFFICIENCY OF THE TRANSMISSION LEVEL, FOR THE RECEIVER MODULE OF AN OPTICAL-FIBER TRANSMISSION SYSTEM

[75] Inventors: Bertrand Jarret; Rose Cordier, both of Paris, France

[73] Assignee: Lignes Telegraphiques et Telephoniques, Conflans Ste. Honorine, France

[21] Appl. No.: 232,966

[22] Filed: Feb. 9, 1981

[30] Foreign Application Priority Data

Feb. 12, 1980 [FR] France ................................ 80 03047

[51] Int. Cl.³ .............................................. H04B 9/00
[52] U.S. Cl. ..................................... 455/612; 455/613; 455/619; 340/556
[58] Field of Search ............... 455/601, 602, 612, 619; 356/73.1; 340/555, 556, 557

[56] References Cited

U.S. PATENT DOCUMENTS 4,249,264  2/1981  Crochet et al. ...................... 455/612

*Primary Examiner*—Robert L. Griffin
*Assistant Examiner*—Edward L. Coles
*Attorney, Agent, or Firm*—Cushman, Darby & Cushman

[57] ABSTRACT

An alarm-triggering device for the receiver of an optical-fiber transmission system including in series a filter which has a passband located externally with respect to the band of frequencies employed for optical-fiber transmission and the input of which is connected to an avalanche photodiode, an amplifier, a rectifier, a voltage comparator circuit, and alarm-triggering circuit.

7 Claims, 3 Drawing Figures

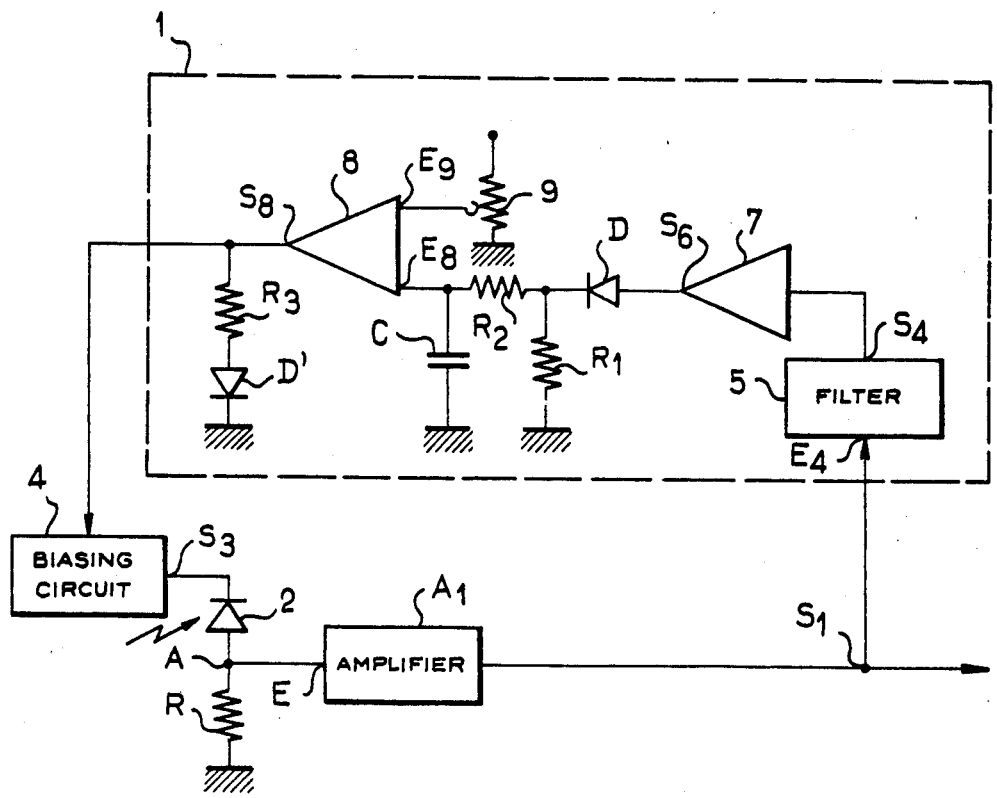
FIG_3

DEVICE FOR TRIGGERING AN ALARM SYSTEM IN THE EVENT OF INSUFFICIENCY OF THE TRANSMISSION LEVEL, FOR THE RECEIVER MODULE OF AN OPTICAL-FIBER TRANSMISSION SYSTEM

This invention relates generally to optical-fiber transmission systems and more particularly to a device for triggering an alarm system in the event of insufficiency of the level of transmission on the line, the device being intended for use in the receiver module of a simplified transmission system for a single-fiber optical communications link.

An optical-fiber transmission system is constituted by a transmitter module, a receiver module and a fiber extending between these modules. The transmitter module comprises a light-emitting base constituted by a laser diode, by a control photodiode and a laser/fiber optical coupling system inserted in a connector plug for connecting said transitter base to the optical-fiber cable, and by an electronic control unit which is intended among other design functions to regulate the optical transmission power. The receiver module comprises a light-detecting base constituted by a photodetector such as an avalanche photodiode and by a photodiode/fiber optical coupling system inserted in a connector plug for connecting said base to the optical-fiber cable, and by an electronic control unit which has the intended function, among others, of automatically regulating the gain of the avalanche photodiode. For a detailed description of the receiver module, reference may usefully be made for example to the article published in "The Bell System Technical Journal", volume 57, No. 6, July-August 1978, page 1837, entitled "Practical 45-Mb/s Regenerator for Lightwave Transmission".

In a transmission system which makes use of a number of optical fibers, it is a known practice to employ a microprocessor for the management of the receiver module and in particular for triggering an alarm system in the event of insufficiency of the transmission level.

However, the use of a microprocessor is not justified in the case of a transmission system which makes use of a single optical fiber.

The invention is therefore directed to a device for triggering an alarm system in the event of insufficiency of the transmission level for the receiver of a transmission system which utilizes an optical fiber, comprising:

a photodetector with automatic gain regulation;

a filter having a passband which is external to the frequency band employed for optical-fiber transmission, the input of said filter being connected to said photodetector, amplifying means connected to the output of said filter, rectifying means connected to the output of said amplifying means, a voltage comparator circuit connected to the output of said rectifying means, and alarm-triggering means connected to the output of said voltage comparator circuit.

It will be noted that the electric circuit of the alarm-triggering device described in the foregoing is of particularly simple design.

In accordance with another distinctive feature of the invention, the passband of the filter is external to the frequency band employed for optical-fiber transmission.

Other features and advantages of the invention will be more apparent upon consideration of the following description and accompanying drawings, wherein:

FIG. 3 is a diagram shown partly in the form of blocks and representing the receiver module which comprises a third alternative embodiment of the alarm-triggering device in accordance with the invention.

Figure 1:
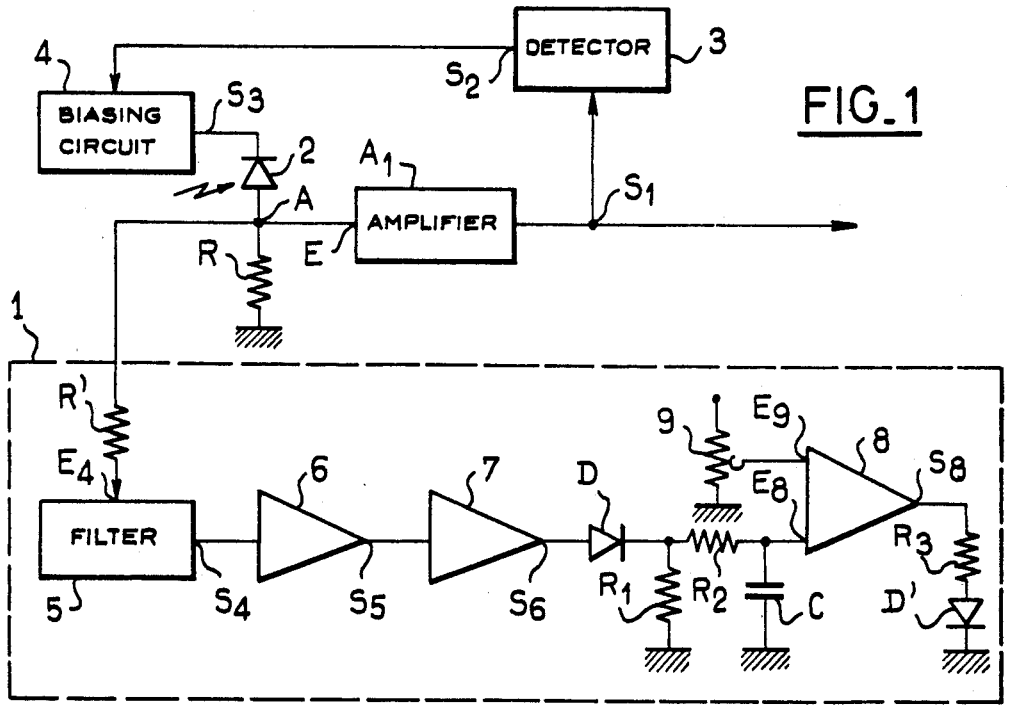
FIG. 1 is a diagram shown partly in the form of blocks and representing the receiver module which comprises a first alternative embodiment of the alarm-triggering device in accordance with the invention.

In a first alternative embodiment of the invention which is illustrated in FIG. 1, the alarm-triggering device 1 in accordance with the invention is connected at A to a photodetector such as, for example, an avalanche photodiode 2 provided within the receiver module of a transmission system which makes use of a single optical fiber. The input E of an amplifier $A_1$ is connected at A to the avalanche photodiode 2 and said amplifier $A_1$ delivers at the output $S_1$ pulses having a peak-to-peak amplitude of 1 volt, for example. A peak-to-peak detector 3 is connected to the output $S_1$ of the amplifier $A_1$ and ensures automatic gain regulation of the avalanche photodiode 2; the output $S_2$ of said detector is connected to a bias circuit 4 of the avalanche photodiode 2, the output $S_3$ of said bias circuit being connected to said avalanche photodiode. The avalanche photodiode 2 is connected to ground at A through a resistor R.

In the description which now follows, consideration will be given to the structure of the alarm-triggering device 1 in accordance with the first alternative embodiment shown in FIG. 1.

Said alarm-triggering device 1 comprises a filter 5, the input $E_4$ of which is connected to the avalanche photodiode 2 through a resistor R' having a value which is distinctly higher than that of the resistor R. It will be noted at this point that the filter 5 has a passband which is external to the frequency band employed for transmission by the pulse code. More specifically, the mean frequency of the filter 5 can be either lower (the filter 5 in this case is a low-pass filter) or higher (the filter 5 in this case is a high-pass filter) than the bottom or top limits of the frequency band employed respectively for transmission by the pulse code.

The output $S_4$ of the filter 5 is connected to a very-low-noise amplifier 6, the output $S_5$ of which is connected to an amplifier 7. At the output $S_6$ of the amplifier 7 is connected a rectifying circuit comprising a diode D and a resistor $R_1$ and, in series, an integrating circuit comprising a resistor $R_2$ and a capacitor C. The output of said integrating circuit is connected to one of the input terminals $E_8$ of a threshold comparator amplifier 8 whilst the other input terminal $E_9$ of said amplifier 8 is connected to a source of variable reference voltage generated at 9. A resistor $R_3$ and an electroluminescent diode D' for controlling an alarm system are connected in series to the output $S_8$ of the comparator amplifier 8. It will readily be apparent that the diode D' can be replaced by any other suitable means without thereby departing from the scope of the invention.

Figure 2:
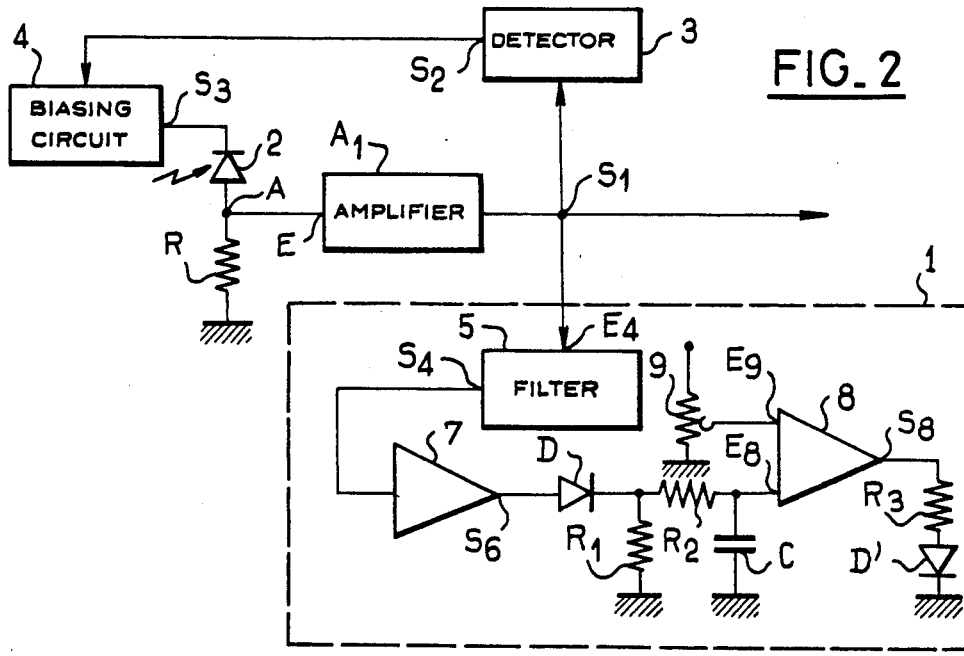
FIG. 2 is a diagram shown partly in the form of blocks and representing the receiver module which comprises a second alternative embodiment of the alarm-triggering device in accordance with the invention.

In FIG. 2, which illustrates a second alternative embodiment of the invention, the elements which are identical with those of FIG. 1 are designated by the same references. The alarm-triggering device 1 is connected to the output $S_1$ of the amplifier $A_1$; more specifically, the input $E_4$ of the filter 5 is connected to the output $S_1$ of the amplifier $A_1$ and the output $S_4$ of said filter 5 is connected directly to the input of the amplifier 7.

In FIG. 3, which illustrates a third embodiment of the invention, the elements which are identical with those of FIG. 2 are in turn designated by the same references. The alarm-triggering device 1 described earlier is connected between the output $S_1$ of the amplifier $A_1$ and the bias circuit 4 of the avalanche photodiode 2. More precisely, the output $S_8$ of the comparator amplifier 8 is connected to the electroluminescent diode D' and to the input of the bias circuit 4. Thus the gain of the avalanche photodiode 2 is automatically regulated by means of the comparator amplifier 8.

The operation and the mode of utilization of the alarm-triggering device in accordance with the invention may be deduced from the foregoing description and will hereinafter be explained in greater detail.

In the first place and under normal operating conditions, that is, with standardized incident optical power, the coded electrical pulses produced by the avalanche photodiode 2 are amplified by the amplifier $A_1$ and have a constant amplitude at the output by virtue of a control loop circuit. The peak-to-peak amplitude of the pulses is in fact measured by the peak-to-peak detector 3 which consequently delivers a proportional direct-current voltage. This voltage is applied to the bias circuit 4 of the avalanche photodiode 2 and therefore controls the gain of this latter, said photodiode being also provided with temperature drift. This control operation thus makes it possible to maintain a standardized and constant amplitude (a peak-to-peak amplitude of 1 volt, for example) of the output signals in spite of any possible variations in ambient temperature and variations in the incident optical power.

Assuming now that there exists an insufficiency of the line transmission level or in other words an insufficiency of the incident optical power by reason of the fact that the amplitude of the output signals remains constant, the control system described in the foregoing gives rise to overbiasing (with respect to normal biasing) of the avalanche photodiode 2 which therefore delivers at its output a noise potential of the order of 1 volt, for example.

The principle of alarm-system triggering lies in the use of the energy within a frequency band which is not employed for transmission of the pulse code; this is obtained by means of the filter 5, the passband of which is external to the frequency band employed by the pulse code.

Thus, in accordance with the alternative embodiment of FIG. 1, the noise is amplified by the first low-noise amplifier 6 and by the second amplifier 7, then rectified by the rectifying circuit (D and $R_1$) and integrated by the integrating circuit ($R_2$ and C) in order to produce a direct-current voltage which is proportional to the effective value of the noise. This voltage is then compared with a reference voltage generated at 9 by the amplifier 8. If this threshold voltage is attained, the comparator amplifier 8 delivers a control signal to the electroluminescent diode D' which triggers an alarm system of any suitable type.

It will be noted that the adjustment of said reference voltage makes it possible to determine the minimum optical alarm power; for example, if the standardized power is $-53$ dBm, the alarm power is $-60$ dBm.

The foregoing description remains applicable to the alternative embodiments illustrated in FIGS. 2 and 3. It should be added that, in regard to the alternative embodiment shown in FIG. 2, the noise is amplified solely by the amplifier 7, taking into account the sufficient level at the output of the amplifier $A_1$. Furthermore, in the alternative embodiment shown in FIG. 3, the alarm-triggering device in accordance with the invention also has the function of ensuring automatic gain regulation of the avalanche photodiode.

What is claimed is:

1. A device for triggering an alarm system in the event of insufficiency of the transmission level for the receiver of a transmission system which utilizes an optical fiber, comprising:
    a photodetector having an automatic gain regulation and producing noise in the event of said insufficiency of transmission level;
    a filter connected to said photodetector for passing said noise, said filter having a passband which is external to the frequency band employed for optical fiber transmission;
    means for amplifying said noise present at the output of said filter;
    means for rectifying said noise present at the output of said amplifying means;
    a circuit for comparing the amplitude of said noise to a threshold amplitude value, said comparing circuit being connected to the output of said rectifying means; and
    alarm-triggering means connected to the output of said comparing circuit for producing an alarm signal when said noise amplitude is greater than said threshold value.

2. A device according to claim 1, wherein the input of said filter is connected to the output of an amplifier which is supplied by said photodetector.

3. A device according to claim 2, further including means for automatically regulating the gain of said photo detector in accordance with said alarm signal.

4. A device according to claim 1 or claim 2, wherein the mean frequency of said filter is lower than the bottom limit of the frequency band employed for optical-fiber transmission.

5. A device according to claim 1 or claim 2, wherein the mean frequency of said filter is higher than the top limit of the frequency band employed for optical-fiber transmission.

6. A device according to claim 1, wherein said amplifying means are constituted by a first low-noise amplifier and a second ampifier connected in series.

7. A device according to claim 1, wherein said photodetector is an avalanche photodiode.

* * * * *